(12) United States Patent
Omiya

(10) Patent No.: US 6,264,380 B1
(45) Date of Patent: Jul. 24, 2001

(54) BARRIER OPENING AND CLOSING MECHANISM

(75) Inventor: Akio Omiya, Ohmiya (JP)

(73) Assignee: Fuji Photo Optical Co., Ltd., Saitama-Ken (JP)

(*) Notice: Subject to any disclaimer, the term of this patent is extended or adjusted under 35 U.S.C. 154(b) by 0 days.

(21) Appl. No.: 09/503,721

(22) Filed: Feb. 14, 2000

(30) Foreign Application Priority Data

Feb. 12, 1999 (JP) .................................................. 11-033661
Feb. 12, 1999 (JP) .................................................. 11-033662

(51) Int. Cl.[7] .................................................. G03B 17/04
(52) U.S. Cl. .................................................. 396/448; 396/349
(58) Field of Search .................................. 396/448, 348, 396/349

(56) References Cited

U.S. PATENT DOCUMENTS 5,761,556 * 6/1998 Ichino .................................. 396/448

FOREIGN PATENT DOCUMENTS 7-55546  1/1990 (JP) .
2612128  11/1993 (JP) .

* cited by examiner

*Primary Examiner*—David M. Gray
(74) *Attorney, Agent, or Firm*—Nixon Peabody LLP; Donald R. Studebaker

(57) ABSTRACT

A barrier opening and closing mechanism for a camera, for opening and closing a lens barrier 22 by rotatably driving a drive ring 24 of a lens barrier 22 provided at the front end of a lens barrel 1 using rotation of a rear lens group 7, comprising first coupling means for coupling the rear lens group 7 to a rotating barrel 6 in such a manner that the rear lens group 7 is caused to rotate about the optical axis in the vicinity of a retracted position of the lens barrel 1 and second coupling means for coupling a barrier drive ring 24 to the rear lens group 7 in such a manner that the barrier opening and closing drive member 23 rotates in accompaniment with rotation of the rear lens group 24.

3 Claims, 18 Drawing Sheets

F I G . 2
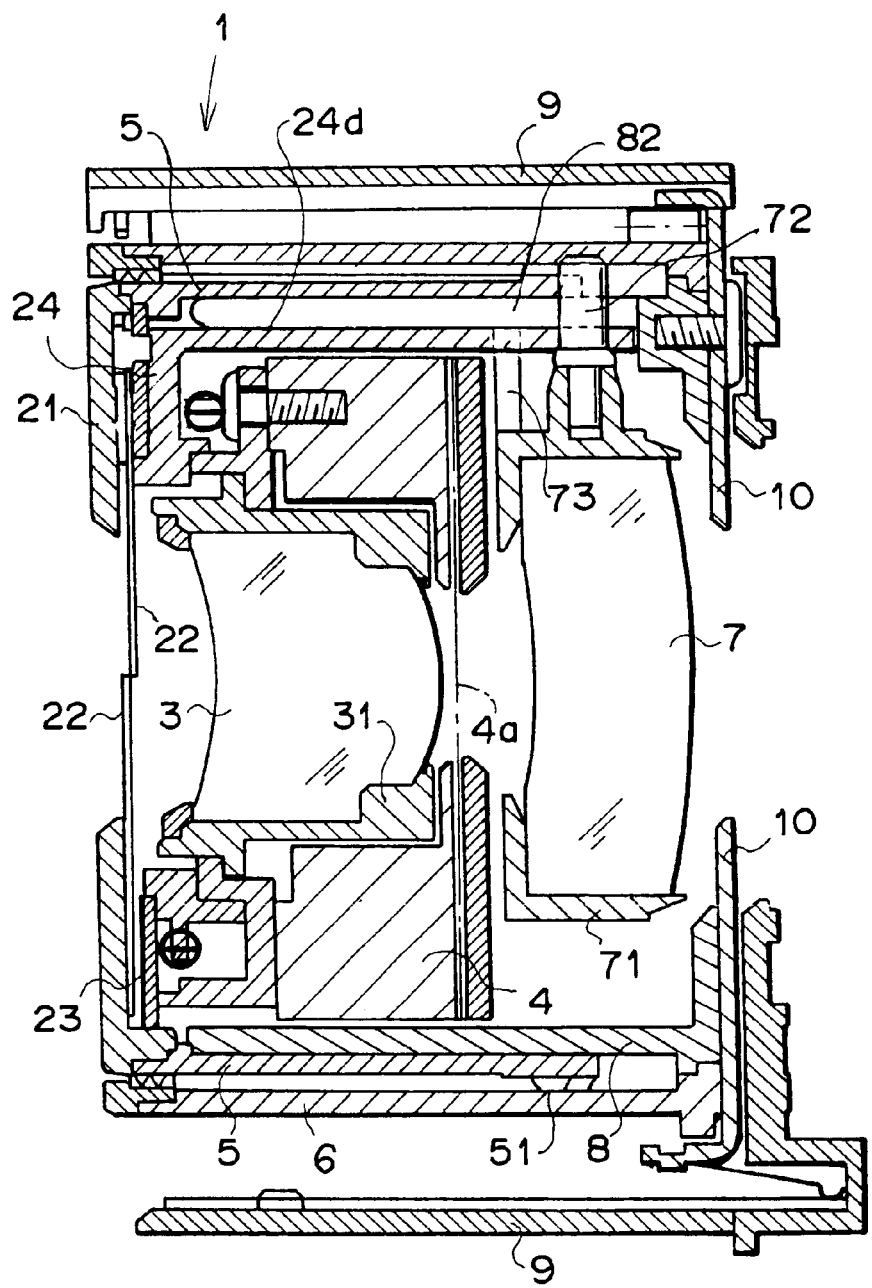

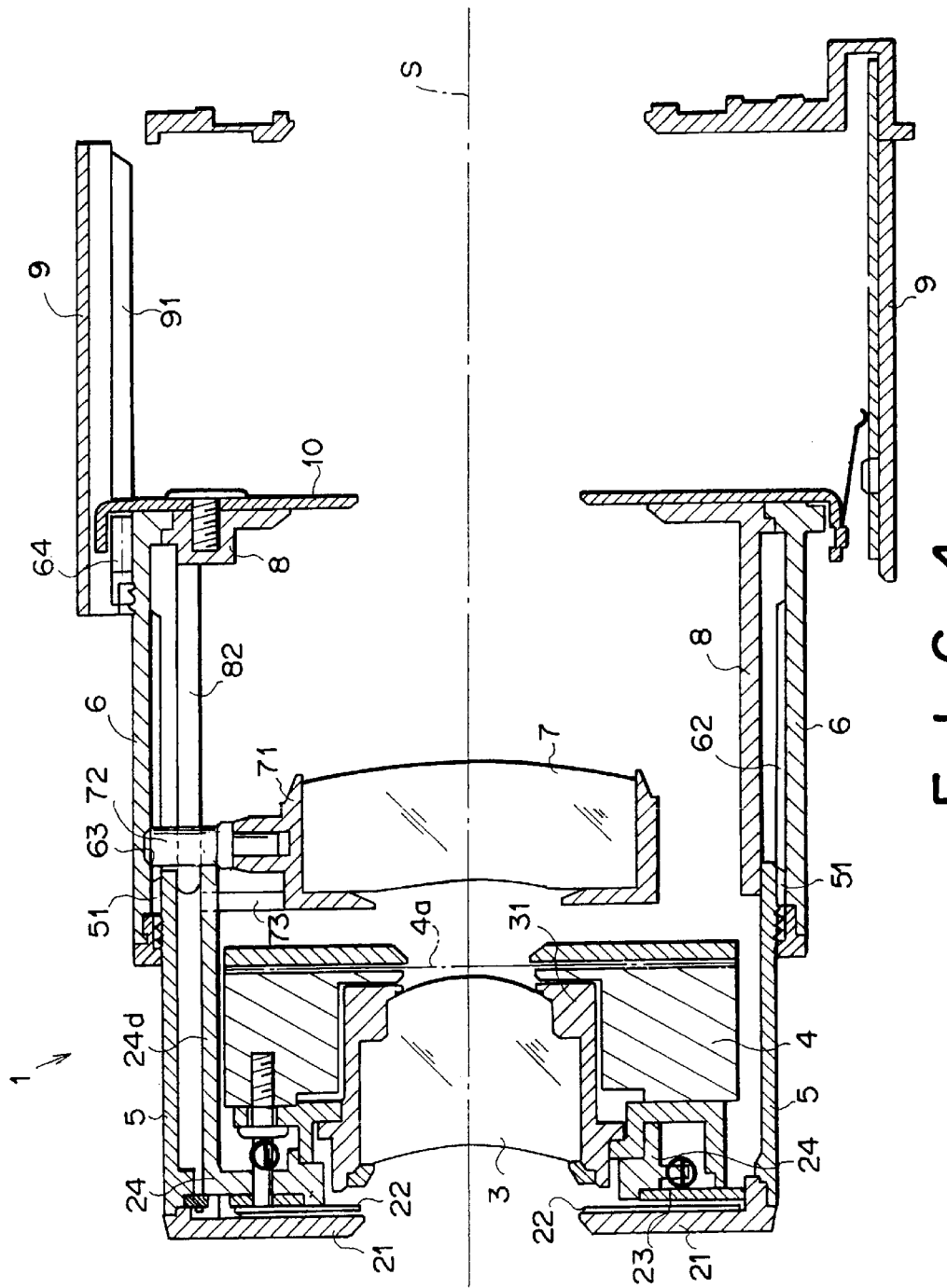
F I G. 4

F I G. 5
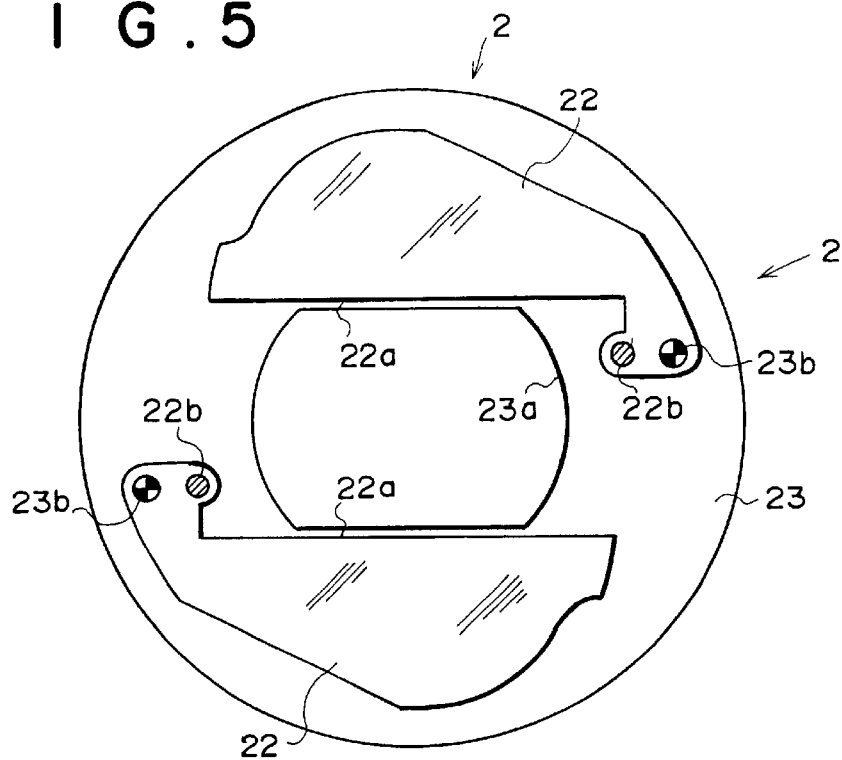
F I G. 6
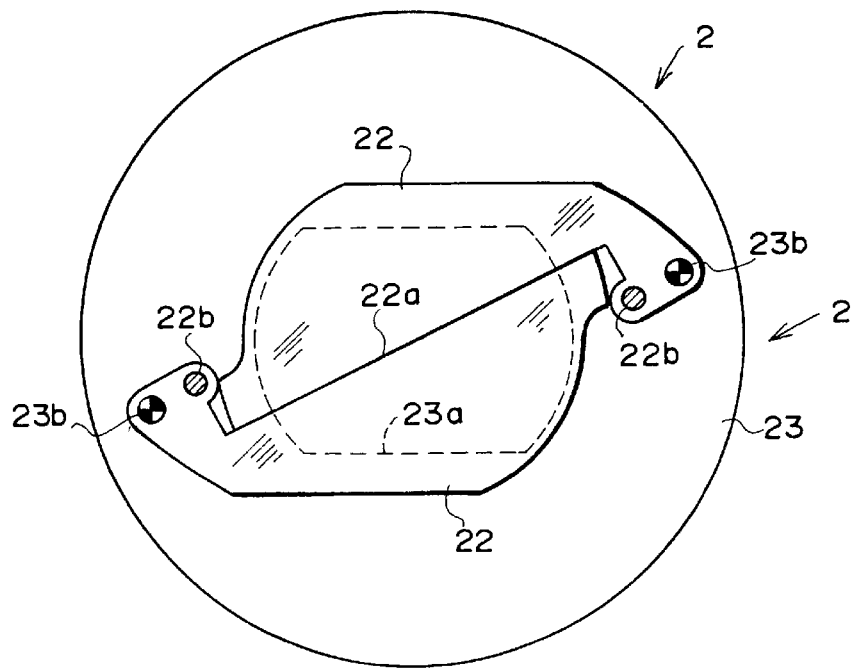

F I G. 16
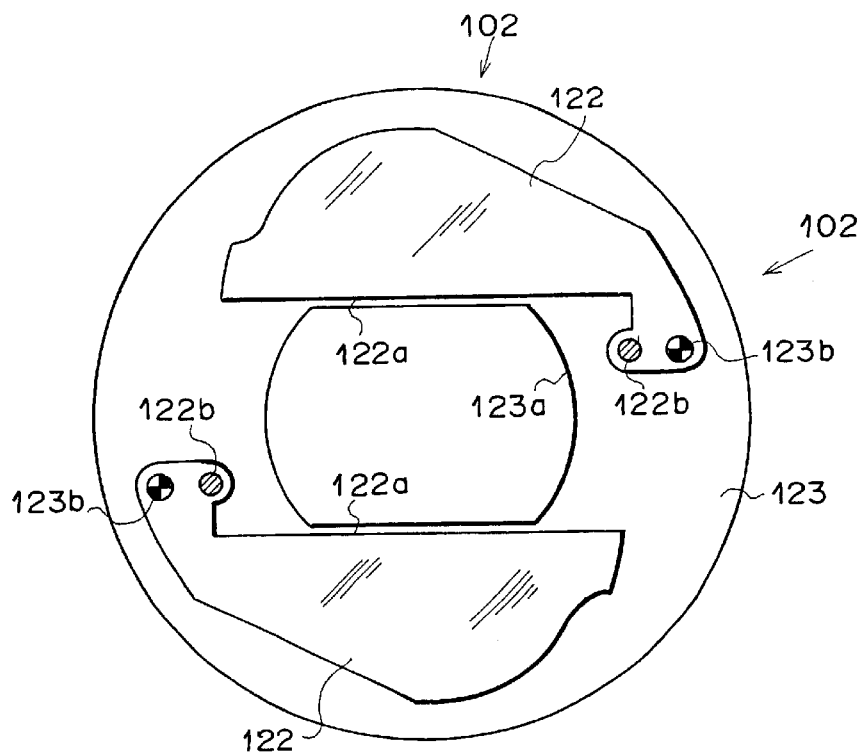
F I G. 17
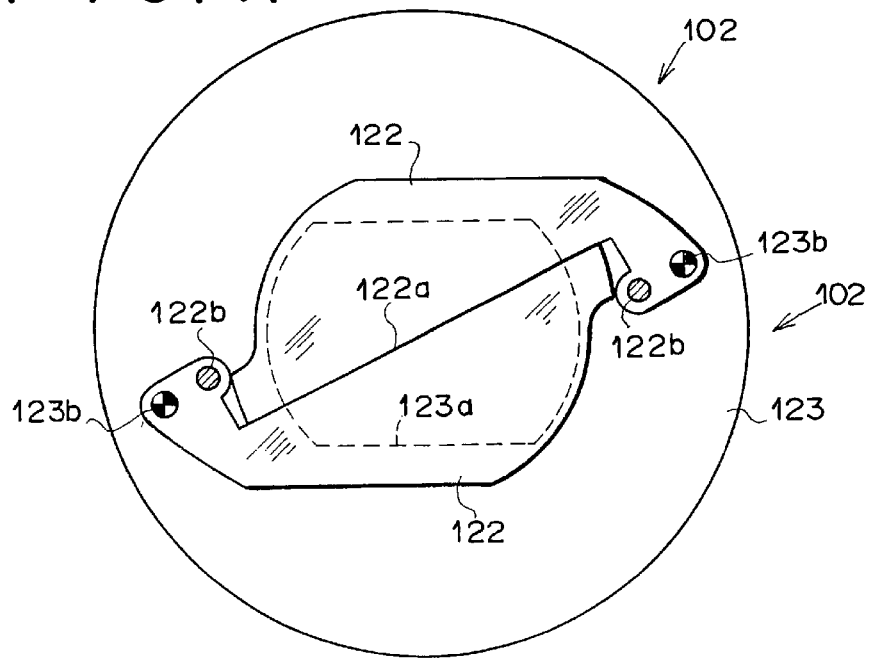

F I G. 18
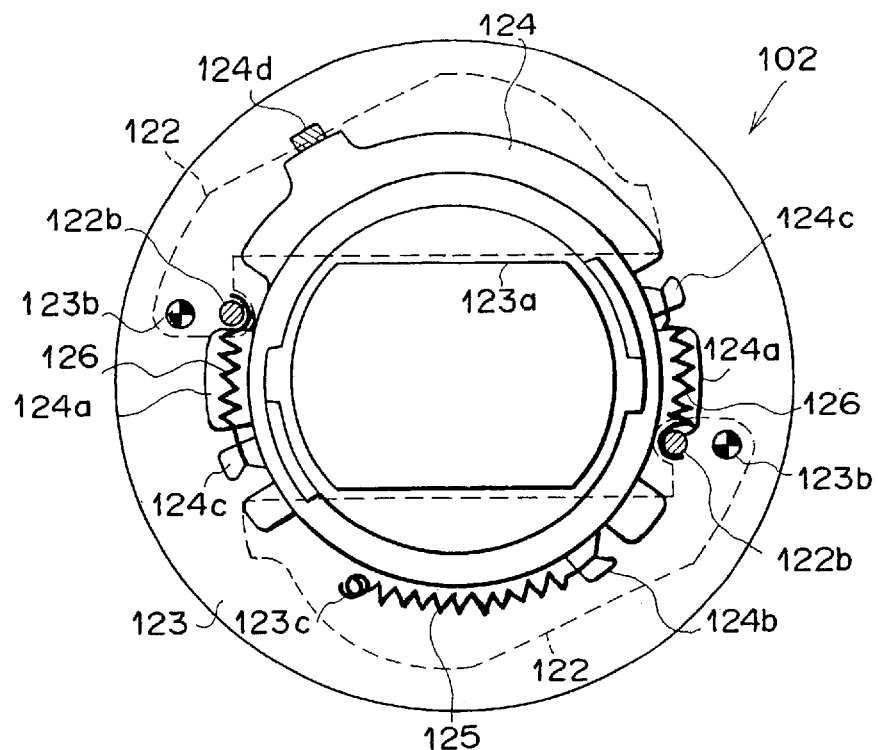
F I G. 19
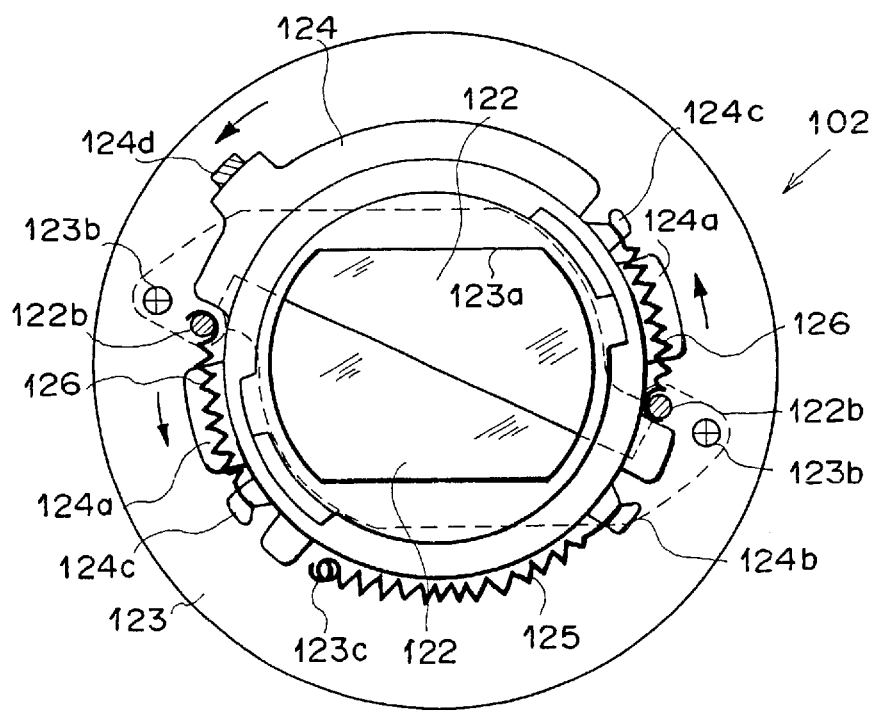

PRIOR ART

BARRIER OPENING AND CLOSING MECHANISM

BACKGROUND OF THE INVENTION

1. Field of the Invention

The present invention relates to a barrier opening and closing mechanism for a camera, for coupling with the extension and retraction of a lens barrel so as to open and close a lens barrier.

2. Description of the Related Art

Cameras where a lens barrel is extended from a camera body and photographs are then taken are typically provided with a lens barrier opening and closing mechanism for opening a lens barrier at the front end of the lens barrel when extending the lens barrel from a completely retracted position (a position where the lens barrel is housed within the camera body) towards a wide-angle end (position where wide-angle photography is possible) and closing the lens barrier (lens cover) when retracting the lens barrel from the wide-angle position to the completely retracted position.

For example, a barrier opening and closing mechanism (first related technology) disclosed in Japanese Patent No. 2612128 comprises urging means (a spring) for urging a lens barrier in an opening direction, closing means moving in accompaniment with a lens system so as to close the lens barrier, and means for disconnecting the barrier closing means so as to open the lens barrier using the urging force of the urging means when the lens system is in an extended position and establishing a link with the lens barrier closing means in accompaniment with movement of the lens system from the extended position towards the retracted position so as to resist the urging force of the urging means and close the lens barrier.

With, for example, a barrier opening and closing mechanism (second related art) disclosed in Japanese Utility Model Publication No. 7(1995)-55545, a key that advances in a rectilinear manner along the optical axis in accompaniment with extension or retraction of a lens barrel is provided at a lens barrel capable of extending from or retracting towards a camera body. A cam section constituted by an inclined plane is then provided at the front end of this key. A coupling ring arranged so as to come into contact with this inclined surface and rotating as a result of the motion of the key so as to open and close the lens barrier is also provided. FIGS. 24A and 24B are views describing the related art.

With this barrier opening and closing mechanism, when the lens barrel is retracted towards the camera body-side, the coupling ring comes into contact with the cam section and rotates in accordance with the incline so that the lens barrier is closed. On the other hand, as shown in FIG. 24A, when the lens barrel is extended, the key A moves along the optical axis in a direction away from the coupling ring B so that the coupling ring B rotates in accordance with the incline of the cam section C' due to this movement, with the lens barrier opening as a result.

However, in the first related technology, when the lens system is in the extended position, the coupling of the lens barrier and barrier closing means is broken, and the lens barrier is held open only by the urging force of the urging means. The barrier opening operation therefore becomes unreliable when the urging force of the spring becomes weaker due to variations caused by aging etc.

In the second related technology, when the moving distance from the completely retracted position to the wide-angle end is short for the lens barrel, the rotating force of the coupling member B is insufficient and the lens barrier cannot be opened and closed in a smooth manner. In this case, because the extent to which the key A moves is small, it is necessary to make the angle of inclination of the cam section C' shallow, as shown in FIG. 24B so that when the coupling member B is rotated to bring the lens barrier to the closed position, a slight movement of the key A causes the coupling ring B to rotate a substantial amount. However, when the cam section C' is configured in this way, transmission of force from the cam section C' to the coupling ring B is not efficient, and when the friction between the portions of the cam section C' and the coupling ring B that make contact with each other is substantial, the coupling ring does not rotate smoothly.

In order to resolve the aforementioned situation, it is a first problem of the present invention to provide a barrier opening and closing mechanism with a smooth and reliable lens barrier opening and closing operation.

In the aforementioned related technology, it is necessary to provide a cam section constituted by an inclined surface at a key member that moves in a rectilinear manner along the optical axis together with the extending and retracting of the lens barrel, and this cam section has been difficult to make.

In order to resolve the aforementioned situation, it is a second problem of the present invention to provide a barrier opening and closing mechanism with a smooth and reliable lens barrier opening and closing operation and which is also easy to make.

SUMMARY OF THE INVENTION

In a barrier opening and closing mechanism of the present invention for resolving the aforementioned first problem, for a camera having a lens barrel equipped with a rotating barrel capable of rotation about an optical axis, a front lens group, and a rear lens group, and being capable of being extended and retracted with respect to a camera body by rotation of the rotating body, a lens barrier, arranged at the front end of the lens barrel, for opening and closing the front surface of the front lens group, and a barrier opening and closing drive member positioned at the lens barrel so as to be rotatable about the optical axis, with rotation of the barrier opening and closing drive member causing the lens barrier to open or close, the barrier opening and closing mechanism comprises:

first coupling means for coupling the rear lens group to the rotating barrel in such a manner that the rear lens group rotates about the optical axis in the vicinity of a retracted position of the lens, and second coupling means for coupling the barrier opening and closing drive member to the rear lens group in such a manner that the barrier opening and closing drive member rotates according to rotation of the rear lens group.

The second coupling means can comprise a coupling lever extending rearwards in the direction of the optical axis from the barrier opening and closing member, and an engaging member provided on the rear lens group holder and being usually engaged with the coupling lever.

According to the present invention, the rear lens group is rotated in the vicinity of the retracted position of the lens barrel by a rotating barrel via the first coupling means and the rotation of the rear lens group is transmitted to the barrier opening and closing drive member via the second coupling means. This has the advantage that the lens barrier opening and closing operation is smooth and reliable because a mechanism for converting movement of members constituting the lens barrel along the direction of the optical axis into rotational movement of a barrier opening and closing drive member is not used.

The lens barrier opening and closing operation is also stable because the second coupling means is such that the rear lens group holder and the barrier opening and closing drive member are usually engaged.

In a barrier opening and closing mechanism for resolving the aforementioned second problem, for a camera having a lens barrel, equipped with a rotating barrel capable of rotation about an optical axis and being capable of being extended and retracted with respect to a camera body by rotation of the rotating barrel, a lens barrier, arranged at the front end of the lens barrel, for opening and closing a lens aperture, and a barrier drive ring positioned at the lens barrel so as to be rotatable about the optical axis, with rotation of the barrier drive ring causing the lens barrier to open or close, the barrier opening and closing mechanism comprises:

- a cam groove provided at the rotating barrel; and
- an actuating lever, having a cam follower engaging with the cam groove, moving in the direction of the optical axis in accordance with rotation of the rotating barrel occurring in the vicinity of a position of retraction of the lens barrel.

According to the present invention, an actuating lever that causes the barrier drive ring to rotate is configured so as to be driven using a cam groove provided on the rotating barrel and the cam groove is therefore easy to make. Further, rotation of the rotating barrel is transmitted to the barrier drive ring via the actuating lever and opening and closing of the lens barrier is therefore smooth and reliable.

BRIEF DESCRIPTION OF THE DRAWINGS

FIG. 2 is a longitudinal view of the lens barrel of FIG. 2 when retracted, cut-away in a vertical plane including the optical axis;

FIG. 4 is a longitudinal view of the lens barrel of FIG. 1 in a telephoto state, cut-away in a vertical plane including the optical axis;

FIG. 5 is an outline front view of a lens barrier section when barriers are open;

FIG. 6 is an outline front view of a lens barrier section when barriers are open;

FIG. 16 is an outline front view of a lens barrier section when barriers are open;

FIG. 17 is an outline front view of a lens barrier section when barriers are open;

FIG. 18 is an outline rear view corresponding to the lens barrier section of FIG. 16;

FIG. 19 is an outline rear view corresponding to the lens barrier section of FIG. 17;

DESCRIPTION OF THE PREFERRED EMBODIMENTS

The following is a description of an embodiment of the present invention based on FIG. 1 to FIG. 11 of the appended drawings.

Figure 1:
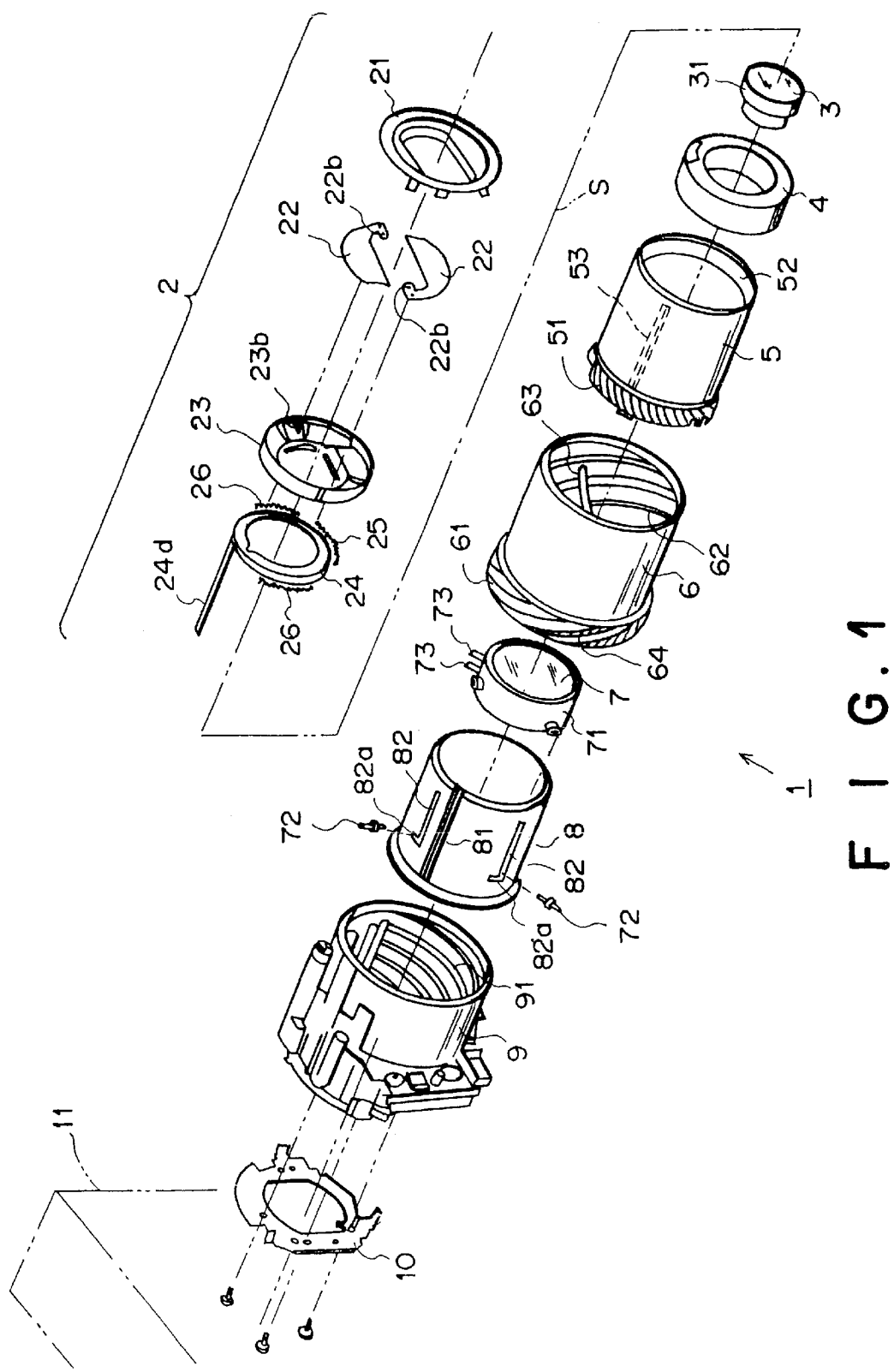
FIG. 1 is an exploded perspective view of a zoom lens barrel equipped with a first embodiment of a barrier opening and closing mechanism of the present invention.
Figure 3:
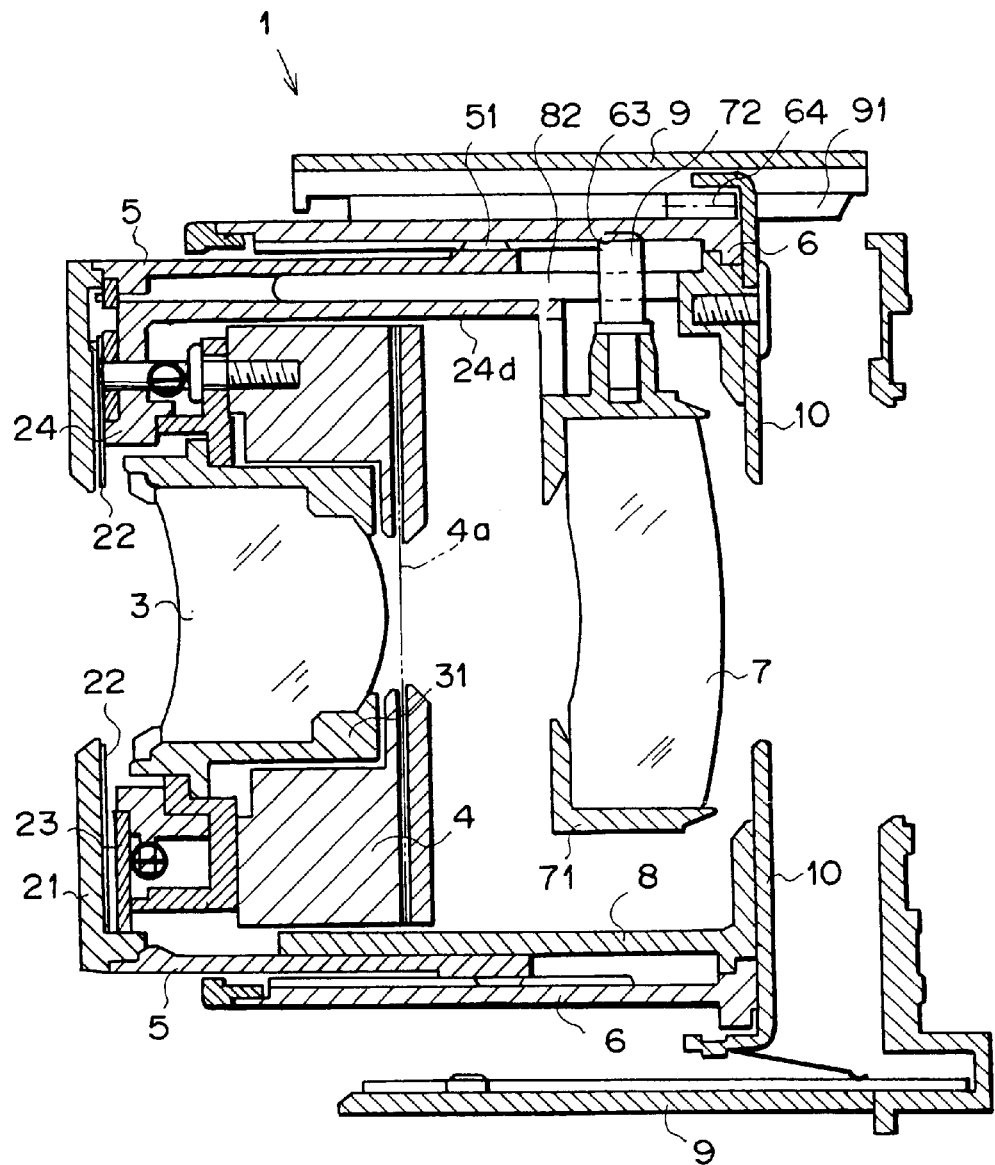
FIG. 3 is a longitudinal view of the lens barrel of FIG. 1 when in a wide-angle photographing state, cut-away in a vertical plane including the optical axis.

FIG. 1 is an exploded perspective view of a zoom lens barrel equipped with the embodiment of a barrier opening/closing mechanism of the present invention. FIG. 2 to FIG. 4 are longitudinal views of the lens barrel shown in FIG. 1 cut-away in a vertical plane including an optical axis, with FIG. 2 showing a fully retracted state (bottom), FIG. 3 showing the state for wide-angle photographing, and FIG. 4 showing the state for telescopic photographing.

In the drawings, a lens barrel 1 can be freely extended or retracted with respect to the camera so as to enable telescopic or wide-angle photographing and comprises, from the front along the optical axis S, a lens barrier section 2, a movable barrel 5 incorporating a shutter block 4 equipped with a front lens group 3 supported at a lens holder 31 and a shutter 4a, a rotating barrel (middle barrel) 6, a rear lens group 7 supported at a lens holder 71, a rectilinear key barrel 8, a fixed barrel 9, and a key plate 10, arranged in a concentric manner. This lens barrel 1 is therefore constructed in such a manner that the rotating barrel 6 and the movable barrel 5 can be telescopically extended and retracted with respect to the fixed barrel 9 fixed to a camera body 11.

The lens barrel 1 employs a helicoidal mechanism in order to extend and retract the rotating barrel 6 and the movable barrel 5, i.e. the rotating barrel 6 is arranged at the inside of the fixed barrel 9, the movable barrel 5 is arranged at the inside of the rotating barrel 6, a helicoid 61 formed at the outer surface of the rear part of the rotating barrel 6 threads with a helicoid 91 formed at the inner surface of the fixed barrel 9, and a helicoid 51 formed at the outer surface of the rear part of the movable barrel 5 screws into the helicoid 62 formed at the inner surface of the rotating barrel 6.

The rectilinear key barrel 8 is inserted at the inside of the movable barrel 5, the key plate 10 screwed to the rear end of the rectilinear key barrel 8 engages with the fixed barrel 9 in such a manner that movement is only possible in the direction of the optical axis, and is stopped by the rear end of the rotating barrel 6 in a state that permits rotation of the rotating barrel 6. A guide channel 81 extending along the optical axis for ensuring that the movable barrel 5 moves in a rectilinear manner and a guide channel 82 extending along the optical axis provided for the rear lens group 7 are formed at the peripheral surface of the rectilinear key barrel 8. A projection 53 formed at the inner surface of the movable barrel 5 so as to extend along the optical axis engages with the guide channel 81. A helicoid 62 and a cam groove 63 for driving the rear lens group 7 are formed at the inner surface of the rotating barrel 6 and three cam pins (cam followers) 72 provided spaced at angles of approximately 120 degrees about the outer surface of the rear lens group holder 71 and projecting in the direction of the diameter pass through the guide channel 82 and engage with the cam groove of the rotating barrel 6. A drive gear (not shown in the drawings) equipped with a long tooth flank extending in the direction of the optical axis and driven by a motor is attached to the outside of the fixed barrel 9. As a result of this drive gear meshing with gear teeth 64 formed on the helicoid 61 of the outer surface of the rear part of the rotating barrel 6, when the drive gear rotates, the rotating barrel 6 advances or retreats in the direction of the optical axis while rotating with respect to the fixed barrel 9 and the rectilinear key barrel 8 advances or retreats together with the rotating barrel 6 without rotating with respect to the fixed barrel 9. The front lens group 3 and the rear lens group 4 therefore proceed in a rectilinear manner along the direction of the optical axis in the photographing region between the wide-angle end and the telephoto end.

The lens barrier section 2 for opening and closing a lens aperture 52 is attached at the front end of the movable barrel 5. This lens barrier section 2 comprises a front surface cover 21, a pair of barriers 22 and 22, a barrier plate 23 and a barrier drive ring 24.

Figure 7:
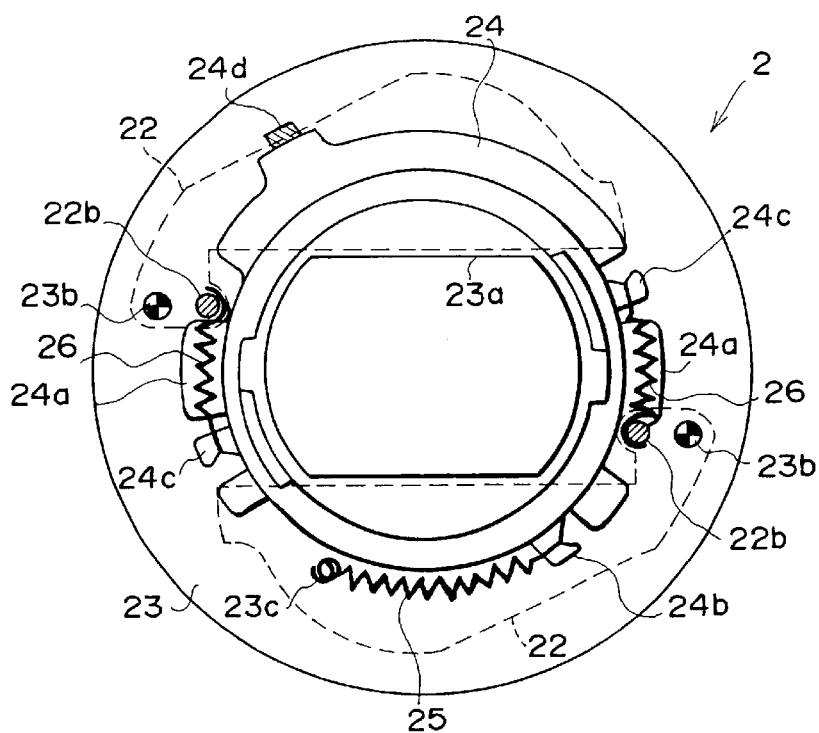
FIG. 7 is an outline rear view corresponding to the lens barrier section of FIG. 5.
Figure 8:
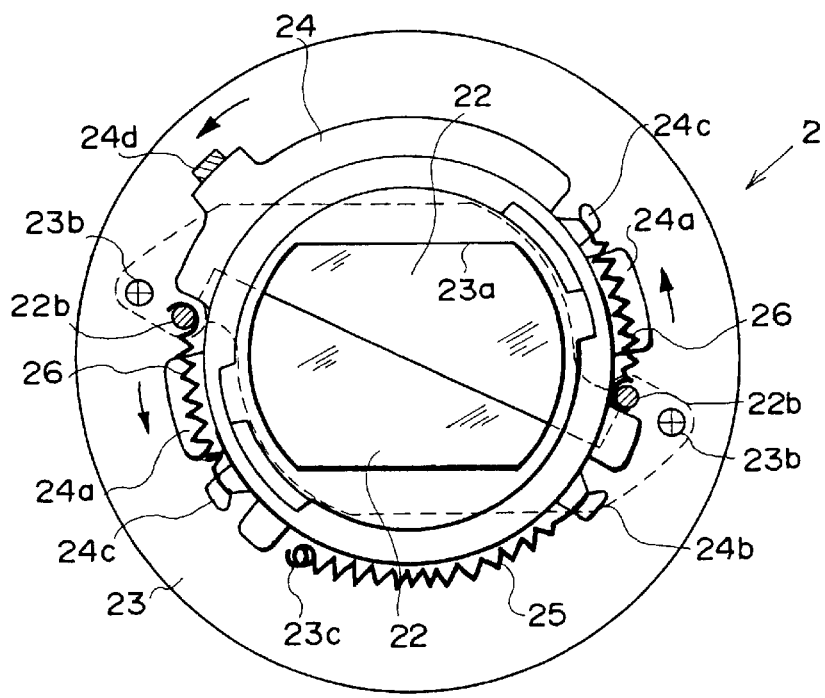
FIG. 8 is an outline rear view corresponding to the lens barrier section of FIG. 6.

FIG. 5 and FIG. 6 are outline front views showing an opening and closing operation of the barriers 22 and 22 of the lens barrier section 2, and FIG. 7 and FIG. 8 are outline rear views showing a drive mechanism for the barriers 22 and 22. FIG. 5 and FIG. 7 show the barriers 22 and 22 open and FIG. 6 and FIG. 8 show the barriers 22 and 22 closed.

The lens barrier section 2 is equipped with the pair of plate-shaped barriers 22 and 22 pivotally supported at their roots by shafts 23b and 23b extending in the direction of the optical axis (vertical direction on the paper), on the barrier substrate 23 equipped with the photographing aperture 23a. Each barrier 22 is equipped with a straight edge 22a, and these straight edges 22a slightly overlap without coming into contact when the barriers 22 are closed.

Pins extending in the direction of the optical axis and positioned spaced at a prescribed distance from the points axially supported by the shafts 23b are installed at the root of each barrier 22 so as to pass through the barrier plate 23. One end of a spring 26 that urges the barrier 22 in the closing direction is stopped by this pin 22b and, as described later, when the lens barrier is open, a projection 24a of the barrier drive ring 24 makes contact with this pin 22b so as to pivotally move the barrier 22 in the opening direction.

As shown in FIG. 7 and FIG. 8, the barrier drive ring 24 is provided on the barrier plate 23 in such a manner as to be capable of rotation about the optical axis within the range of a prescribed angle. A pair of projections 24a and 24a for pivotally moving the barriers 22 to the open position, stoppers 24b for stopping one end of a spring 25 for urging the barrier drive spring 24 in the clockwise direction of FIG. 7 and FIG. 8, stoppers 24c and 24c for stopping one end of the springs 26 and 26 for urging the barriers 22 and 22 in the opening direction, stoppers 24c and 24c for stopping an end of the springs 26 and 26 for urging the barriers 22 and 22 in the opening direction and a coupling lever 24d for rotating the barrier drive ring 24 in the anti-clockwise direction of FIG.7 and FIG. 8 are integrally provided about the outer periphery of the barrier drive ring 24. This coupling lever 24d extends rearwards along the direction of the optical axis at the inside of the rectilinear key barrel 8.

The springs 26 are suspended between the pins 22b of the barriers 22 and the stoppers 24c of the barrier drive ring 24 so that each barrier 22 is urged in a clockwise direction about the axis 23b as shown in FIG. 7 and FIG. 8, i.e. urged in the closing direction. The spring 25 is suspended between a stopper pin 23c established on the barrier plate 23 and a stopper 24b of the barrier drive ring 24 so as to urge the barrier drive ring 24 in the clockwise direction of FIG. 7 and FIG. 8, i.e. in opposition to the urging force of the springs 26 and 26.

When the barrier drive ring 24 is stopped at the end rotating in the clockwise direction shown in FIG. 7 due to the urging force of the spring 25, the edges of each of the projections of the barrier drive ring 24 come into contact with the pins 22b of each barrier 22, each barrier 22 resists the urging force of the springs 26 so as to bring about pivotal motion in an anti-clockwise direction about the axis 23b, and as a result, the barriers 22 and 22 are held in the open position shown in FIG. 5. When the barrier drive ring 24 equipped with the coupling lever 24d rotates in an anti-clockwise direction against the urging force of the spring 25 due to a second coupling means described later and is stopped by the anti-clockwise rotating end as shown in FIG. 8, the projection 24a of the barrier drive ring 24 releases the pins 22b of each barrier 22. Each barrier 22 is therefore pivotally moved in the anti-clockwise direction of FIG. 5 and FIG. 6 about the axis 23b due to the urging force of the springs 26 and held in the closed position shown in FIG. 6.

Figure 9:
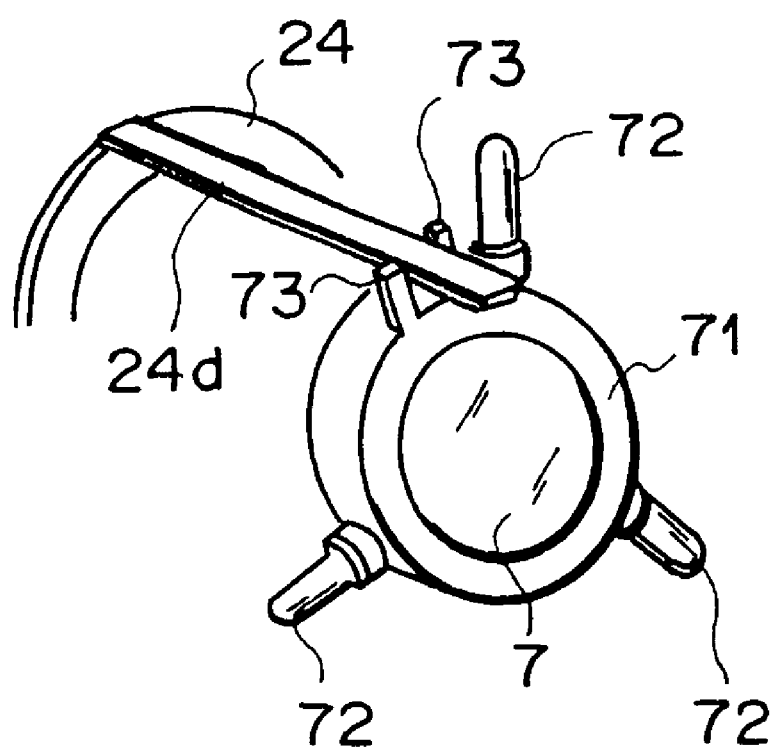
FIG. 9 is an oblique view showing an example configuration for a second coupling means.

On the other hand, as shown in FIG. 9, a pair of engaging pins 73 and 73 are provided at the outer periphery of the rear lens group holder 71 and the tip of the coupling lever 24d extending from the barrier drive ring 24 is inserted into the gap between the pair of coupling pins 73 and 73. The engaging pins 73 and 73 (second coupling means) usually engage with both edges of the coupling lever 24d along the entire range of operation of the lens barrel 1 from the fully retracted state shown in FIG. 2 to the telephotographic state shown in FIG. 4, with relative movement of the coupling lever 24d along the optical axis being permitted.

The first coupling means coupling the rear lens group holder 71 to the rotating barrel 6 is provided at the rotating barrel in such a manner that the rear lens group holder 71 rotates about the optical axis in the vicinity of the retracted position of the lens barrel.

Figure 10:
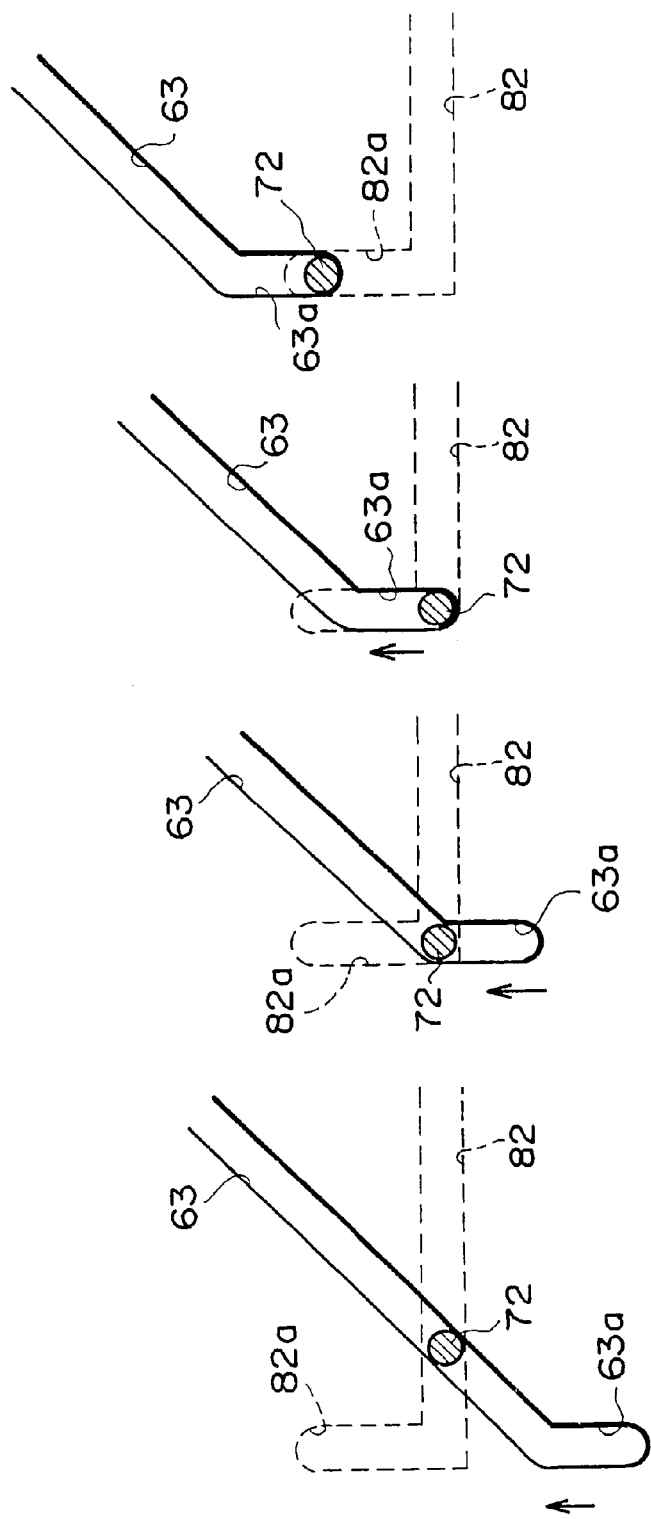
FIGS. 10A to 10D are explanatory views showing the sequence of the operation of the first coupling means when a lens barrel is retracted in to a fully retracted state from a state where photographing is possible.

Namely, as shown in FIG. 10, an extension 63a extending at right-angles to the optical axis and having a relatively short prescribed length is formed at the rear end (wide end) of the rear lens group driving cam groove 63 formed at the inner surface of the rotating barrel 6. An extension 82b extending at right angles to the optical axis in the opposite direction to the extension 63a of the cam groove 63 is also formed at the rear end of the three rear lens group guide channels 82 extending in the direction of the optical axis and formed at the rectilinear key barrel 8.

When the cam pin 72 engaged within the rear lens group driving channel 63 is guided by the guide channel 82 of the rectilinear key barrel 8 so as to reach the wide-angle end shown in FIG. 3 and FIG. 10B due to the rotating barrel 6 being rotatably driven by a motor from the telephoto end shown in FIG. 4 towards the wide-angle end to the upper part of FIG. 10, the cam pin 72 is positioned at the root of the extension 63a of the cam groove 63. Even when the rotating barrel 6 is rotatably driven towards the fully retracted position, the cam pin 72 is first inserted into the extension 63a of the cam groove 63 and the rear lens group holder 71 is held in a halted position. In the midway stage until the rotating barrel 6 reaches the fully retracted position, as shown in FIG. 10C, the cam pin 72 is pushed upwards as shown in FIG. 10C by the front end of the extension 63a of the cam groove 63 from when the cam pin 72 reaches the front end of the extension 63a of the cam groove 63. However, as shown in FIG. 10D, deviation along the extension 82a of the cam pin 72 accompanying the rotation up to the fully retracted position of the rotating barrel 6 is permitted because the extension 82a is formed in the guide channel 82 of the rectilinear key barrel 8, and the rear lens group holder 71 rotates during this time. In accompaniment with the rotation of the rear lens group holder 71, the coupling lever 24d of the barrier drive ring 24 is rotated in an anti-clockwise direction of FIG. 8 against the urging force of the spring 25 by one of the engaging pins 73 and the barriers 22 and 22 are closed, as shown in FIG. 6.

Figure 11:
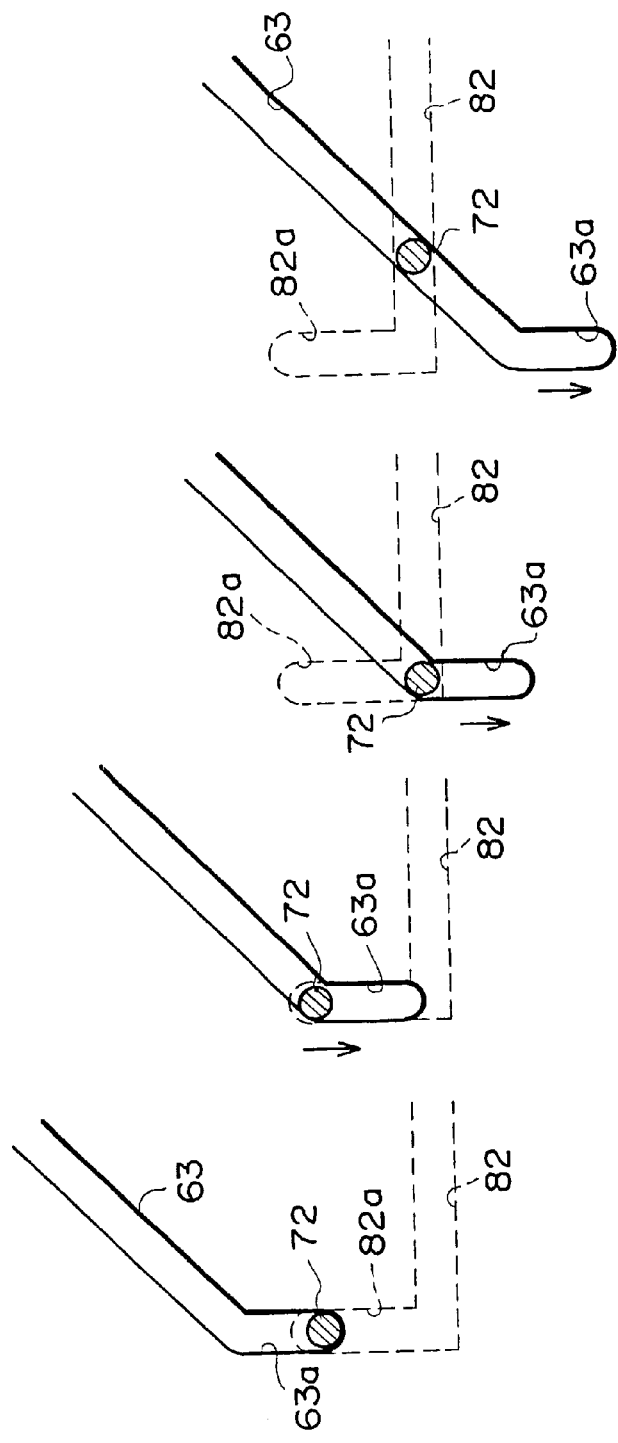
FIGS. 11A to 11D are explanatory views showing the sequence of the operation of the first coupling means when a lens barrel goes from the fully retracted state to a state where photographing is possible.

Next, when the rotating barrel 6 rotates from the completely retracted position shown in FIG. 11A which is the same as FIG. 10D towards the wide-angle end to the lower part of FIG. 11, although there is no force acting on the cam pin 72, when the cam pin 72 reaches the root of the extension 63a of the cam groove 63 as shown in FIG. 11B, as shown in 11(C), the cam pin 72 pushes against the inclined surface of the cam groove 63, moves along the extension 82a of the guide channel 82 of the rectilinear key barrel 8 towards the lower part shown in the drawing, reaches the root of the extension 82a and enters the wide-angle state shown in FIG. 3. The coupling lever 24d of the barrier drive ring 24 is rotated in a clockwise direction of FIG. 8 by the other coupling pin in accompaniment with the rotation of the rear lens group holder 71 during this time and the barriers 22 and 22 open as shown in FIG. 5.

When the rotating barrel 6 rotates downwards in FIG. 11 towards the telephoto end, as shown in FIG. 11D, the cam pin 72 is guided by the guide channel 82 so as to move towards the right.

As is clear from the above description, in this embodiment, the rear lens group holder 71 is caused to rotate by a first coupling means in accompaniment with rotation of the rotating barrel 6 between a wide-angle end and a position of complete retraction and rotation of the rear lens group holder 71 is transmitted to the barrier drive ring 24 via usually engaged second coupling means. The barriers 22 and 22 can therefore be opened and closed in a smooth and reliable manner.

The opening and closing operation of the lens barrier is also stable because the pair of engaging pins 73 and 73 provided so as to project from the rear lens group holder 71 usually engage with both edges of the coupling lever 24d and the spring 25 for urging the barrier drive ring 24 in the barrier closing direction can be omitted.

The following is a description of a further embodiment of the present invention based on FIG. 12 to FIG. 23 of the appended drawings.

Figure 12:
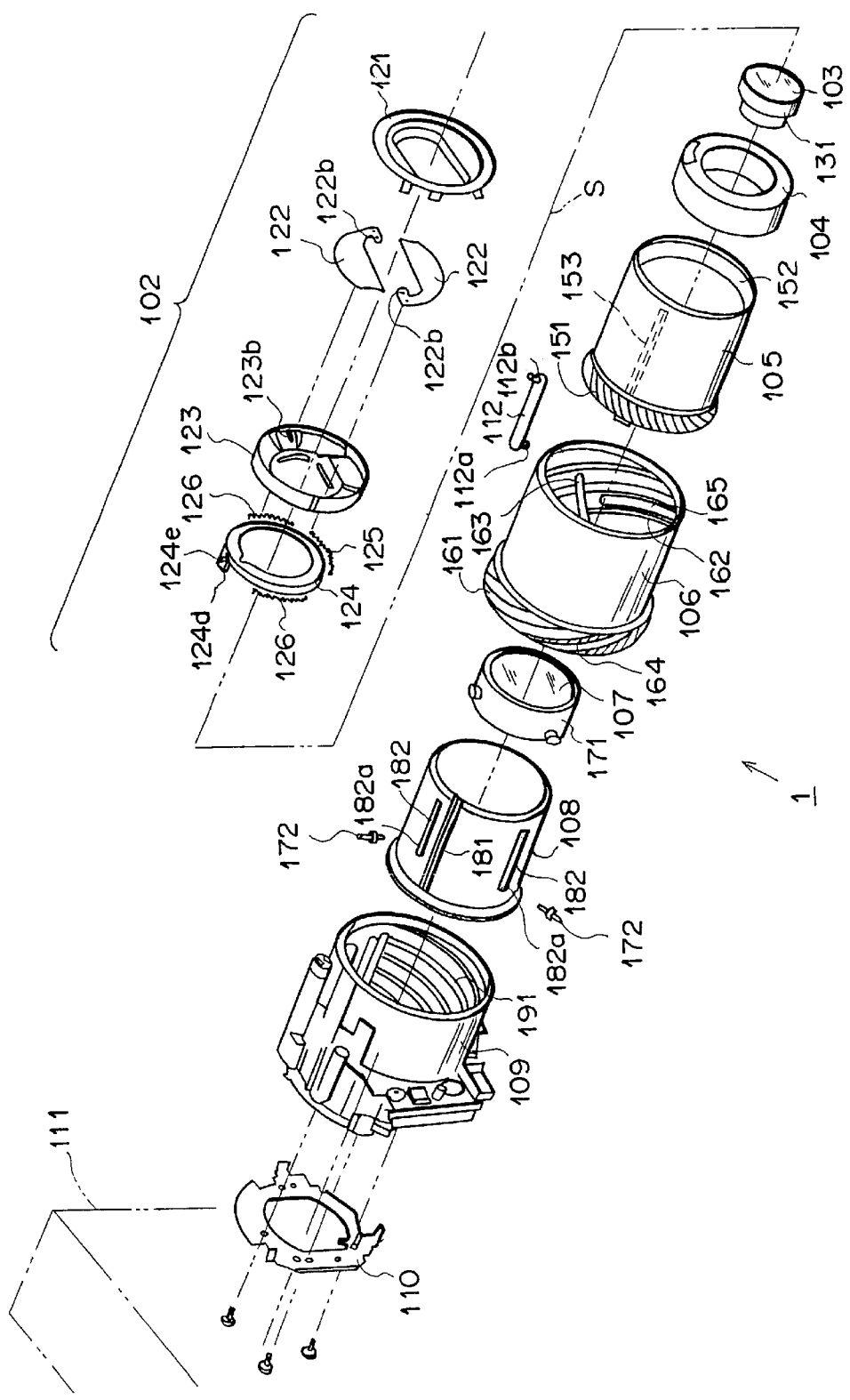
FIG. 12 is an exploded perspective view of a zoom lens barrel equipped with a further embodiment of a barrier opening and closing mechanism of the present invention.
Figure 13:
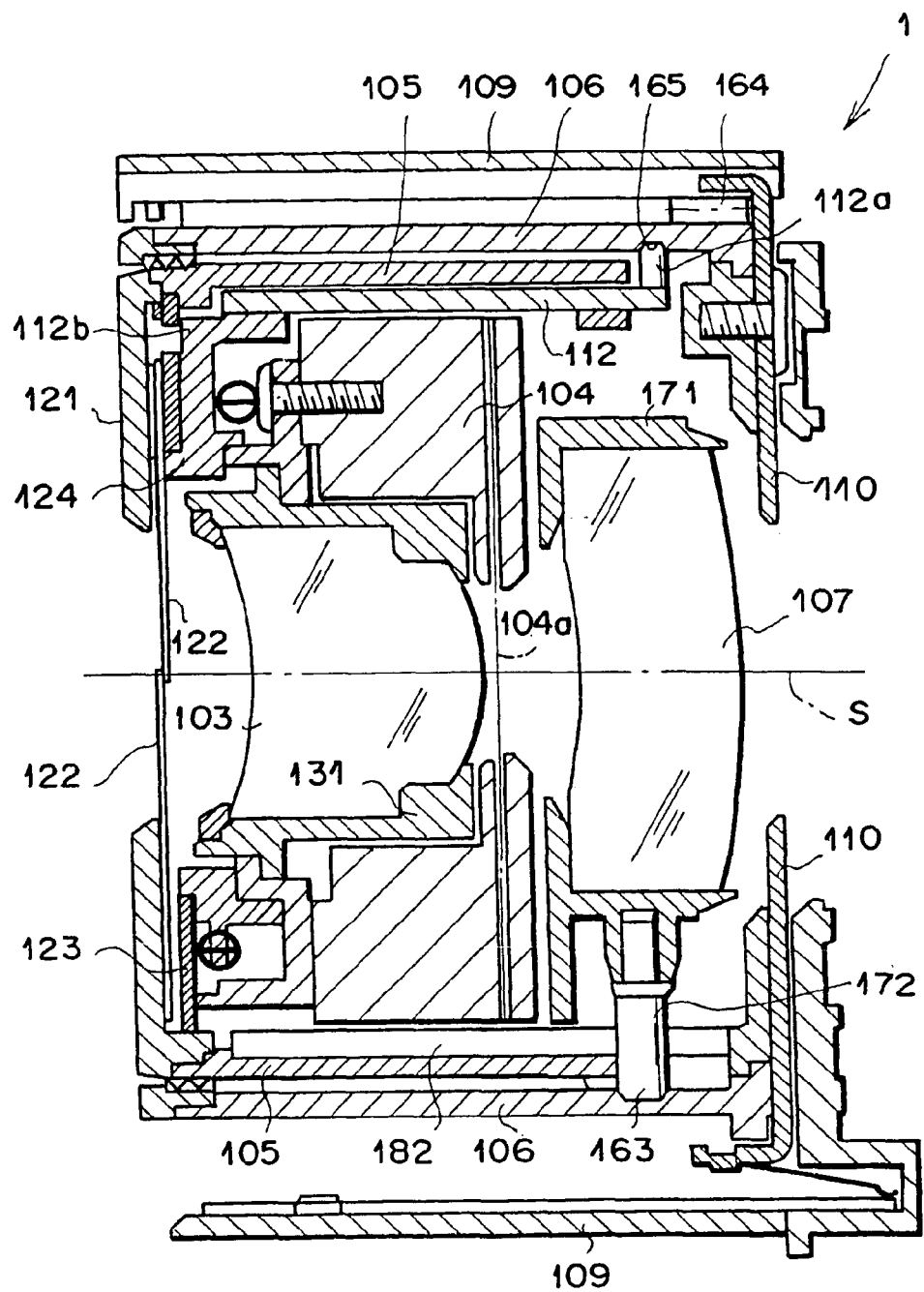
FIG. 13 is a longitudinal view of the lens barrel of FIG. 12 when retracted, cut-away in a vertical plane including the optical axis.
Figure 14:
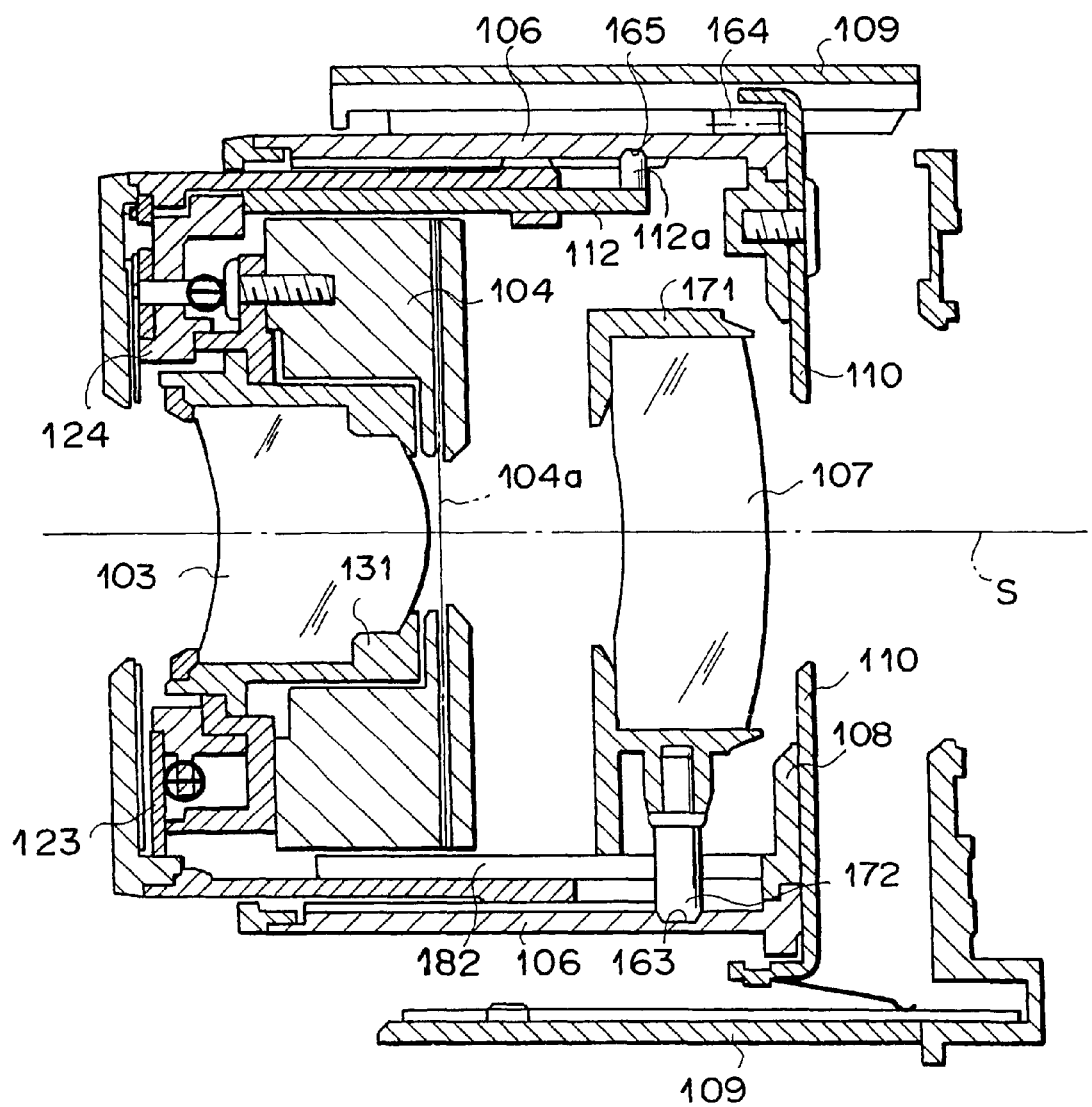
FIG. 14 is a longitudinal view of the lens barrel of FIG. 12 when in a wide-angle photographing state, cut-away in a vertical plane including the optical axis.
Figure 15:
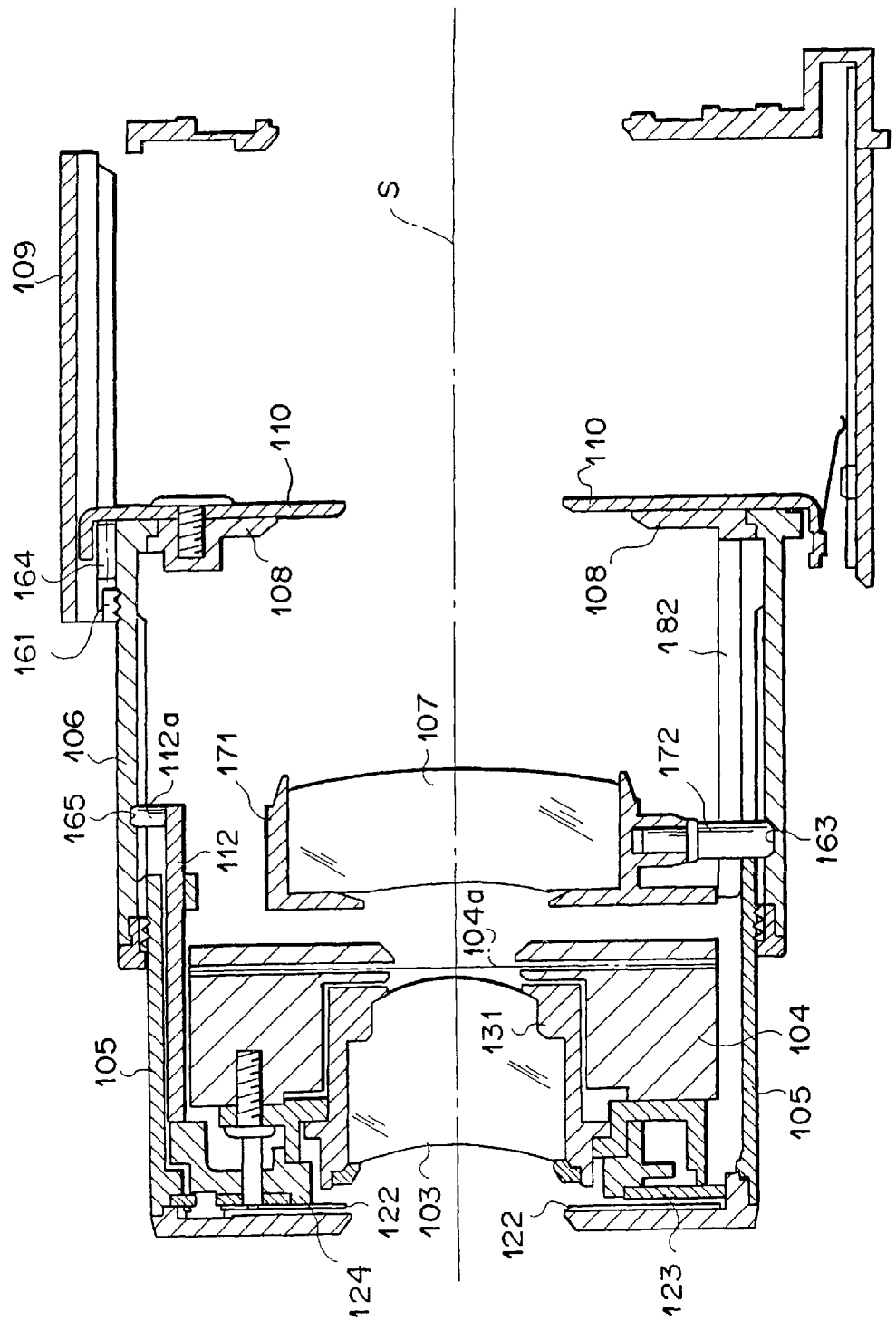
FIG. 15 is a longitudinal view of the lens barrel of FIG. 12 in a telephoto state, cut-away in a vertical plane including the optical axis.

FIG. 12 is an exploded perspective view of a zoom lens barrel equipped with the further embodiment of a barrier opening/closing mechanism of the present invention. FIG. 13 to FIG. 15 are longitudinal views of the lens barrel shown in FIG. 12 cut-away in a vertical plane including an optical axis, with FIG. 13 showing a fully retracted state (bottom), FIG. 14 showing the state for wide-angle photographing, and FIG. 15 showing the state for telescopic photographing.

In FIG. 12, a lens barrel 101 can be freely extended or retracted with respect to a camera body 111 so as to enable telescopic or wide-angle photographing and comprises, from the front along the optical axis S, a lens barrier section 102, a movable barrel 105 incorporating a shutter block 104 equipped with a front lens group 103 supported at a lens holder 131 and a shutter 104a, a rotating barrel (middle barrel) 106, a rear lens group 107 supported at a lens holder 171, a rectilinear key barrel 108, a fixed barrel 109, and a key plate 110, arranged in a concentric manner. This lens barrel 101 is therefore constructed in such a manner that the rotating barrel 106 and the movable barrel 105 can be telescopically extended and retracted with respect to the fixed barrel 109 fixed to the camera body 111.

The lens barrel 101 employs a helicoidal mechanism in order to extend and retract the rotating barrel 106 and the movable barrel 105, i.e. the rotating barrel 106 is arranged inside the fixed barrel 109, the movable barrel 105 is arranged inside the rotating barrel 106, a helicoid 161 formed at the outer surface of the rear part of the rotating barrel 106 screws into a helicoid 191 formed at the inner surface of the fixed barrel 109, and a helicoid 151 formed at the outer surface of the rear part of the movable barrel 105 screws into the helicoid 162 formed at the inner surface of the rotating barrel 106.

The rectilinear key barrel 108 is inserted into the movable barrel 105, the key plate 110 fixed using a screw to the rear end of the rectilinear key barrel 108 engages with the fixed barrel 109 in such a manner that movement is only possible in the direction of the optical axis, and is stopped by the rear end of the rotating barrel 106 in a state that permits rotation of the rotating barrel 106. A guide channel 81 extending along the optical axis for ensuring that the movable barrel 105 moves in a rectilinear manner and a guide channel 82 extending along the optical axis provided for the rear lens group 107 are formed at the peripheral surface of the rectilinear key barrel 108. A projection 153 formed at the inner surface of the movable barrel 105 so as to extend along the optical axis engages with the guide channel 81.

A helicoid 162 and a cam groove 163 for driving the rear lens group 107 are formed at the inner surface of the rotating barrel 06 and three cam pins (cam followers) 172 provided spaced at angles of approximately 120 degrees about the outer surface of the rear lens group holder 171 and projecting in the direction of the diameter pass through the guide channel 182 and engage with the cam groove of the rotating barrel 106. A drive gear (not shown in the drawings) equipped with a long tooth flank extending in the direction of the optical axis and driven by a motor is attached to the outside of the fixed barrel 109. As a result of this drive gear meshing with gear teeth 164 formed on the helicoid 161 of the outer surface of the rear part of the rotating barrel 106, when the drive gear rotates, the rotating barrel 106 advances or retreats in the direction of the optical axis while rotating with respect to the fixed barrel 109 and the rectilinear key barrel 108 advances or retreats together with the rotating barrel 106 without rotating with respect to the fixed barrel 109. The front lens group 3 and the rear lens group 4 therefore proceed in a rectilinear manner along the direction of the optical axis in the photographing region between the wide end and the telephoto end.

The lens barrier section 102 for opening and closing a lens aperture 152 is attached at the front end of the movable barrel 105. This lens barrier section 102 comprises a front surface cover 121, a pair of barriers 122 and 122, a barrier plate 123 and a barrier drive ring 124.

FIG. 16 and FIG. 17 are outline front views showing an opening and closing operation of the barriers 122 and 122 of the lens barrier section 102, and FIG. 18 and FIG. 19 are outline rear views showing a drive mechanism for the barriers 122 and 122. FIG. 16 and FIG. 18 show the barriers 122 and 122 open and FIG. 17 and FIG. 19 show the barriers 122 and 122 closed.

The lens barrier section 102 is equipped with the pair of plate-shaped barriers 122 and 122 pivotally supported at their roots by shafts 123b and 123b extending in the direction of the optical axis (vertical direction on the paper), on the barrier substrate 123 equipped with the photographing aperture 123a. Each barrier 122 is equipped with a straight edge 122a that slightly overlap without coming into contact when the barriers 122 are closed.

Pins extending in the direction of the optical axis and positioned spaced at a prescribed distance from the points axially supported by the shafts 123b are installed at the root of each barrier 122 so as to pass through the barrier plate 123. One end of a spring 126 that urges the barrier 122 the closing direction is stopped by this pin 122b and, as described later, when the lens barrier is open, a projection 124a of the barrier drive ring 124 makes contact with this pin 22b so as to pivotally move the barrier 122 in the opening direction. As shown in FIG. 18 and FIG. 19, the barrier drive ring 124 is provided on the barrier plate 123 in such a manner as to be capable of rotation within the range of a prescribed angle about the optical axis. A pair of projections 124a and 124a for pivotally moving the barriers 122 to the open position, stoppers 124b for stopping one end of a spring 125 for urging the barrier drive spring 124 the clockwise direction of FIG. 18 and FIG. 19, stoppers 124c and 124c for stopping one end of the springs 126 and 126 for urging the barriers 122 and 122 in the opening direction and stoppers 124c and 124c for stopping an end of the springs 126 and 126 for urging the barriers 122 and 122 in the opening direction are integrally provided about the outer periphery of the barrier drive ring 124. This coupling lever 124d extends rearwards along the direction of the optical axis at the inside of the rectilinear key barrel 108.

The springs 126 are suspended between the pins 122b of the barriers 122 and the stoppers 124c of the barrier drive ring 124 so that each barrier 122 is urged in a clockwise direction of FIG. 18 and FIG. 19 about the axis 123b, i.e. urged in the closing direction. The spring 125 is suspended between a stopper pin 123c established on the barrier plate 123 and a stopper 124b of the barrier drive ring 124 so as to urge the barrier drive ring 124 in the clockwise direction of FIG. 18 and FIG. 19, i.e. in opposition to the urging force of the springs 126 and 126. When the barrier drive ring 124 is stopped at the end rotating in the clockwise direction shown in FIG. 18 due to the urging force of the spring 125, the edges of each of the projections of the barrier drive ring 124 come into contact with the pins 122b of each barrier 122, each barrier 122 resists the urging force of the springs 126 so as to bring about pivotal motion in an anti-clockwise direction about the axis 123b, and as a result, the barriers 122 and 122 are held in the open position shown in FIG. 16. When the barrier drive ring 124 equipped with the coupling lever 124d rotates in an anti-clockwise direction against the urging force of the spring 125 due to a second coupling means described later and is stopped by the anti-clockwise rotating end as shown in FIG. 19, the projection 124a of the barrier drive ring 124 releases the pins 122b of each barrier 122. Each barrier 122 is therefore pivotally moved in the anti-clockwise direction of FIG. 16 and FIG. 17 about the axis 23b due to the urging force of the springs 26 and held in the closed position shown in FIG. 17.

Figure 20:
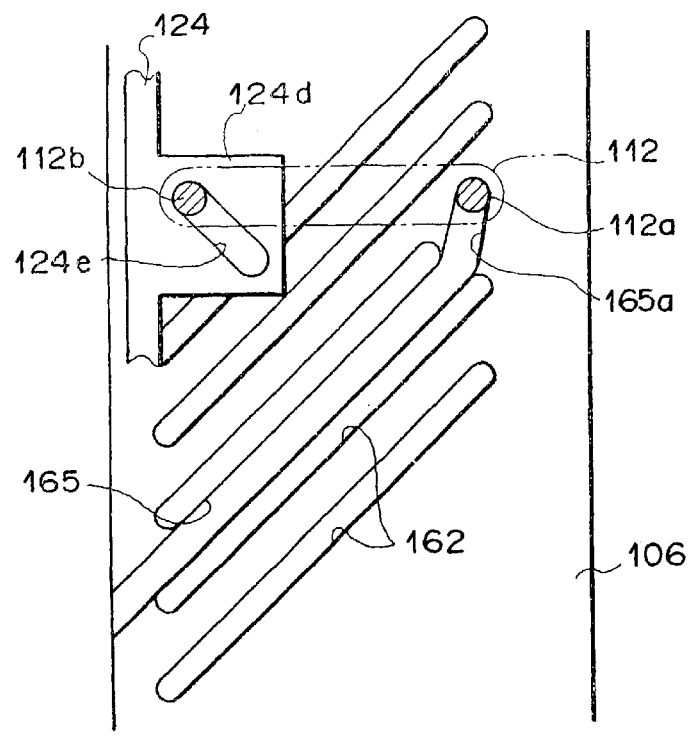
FIG. 20 is a view showing a mechanism for rotating a barrier drive ring.

On the other hand, a single cam groove 165 of the kind shown in FIG. 20 is formed at the inner surface of the rotating barrel 106 formed with the helicoid 162 threading with the helicoid 151 of the moveable barrel 105 and the rear lens group driving cam groove 163, between and parallel to neighboring linear helicoids 162 and 162. A right upper end (rear end) of the cam groove 165 extending in a direction from the lower left to the upper right of FIG. 20 is bent so as to be slightly inclined with respect to a plane at right angles to the optical axis, and this point of bending corresponds to the wide-angle end shown in FIG. 14. At the inside of the moveable barrel 105, a cam pin (cam follower) 112a projecting from the rear end of an actuating lever 112 arranged in such a manner as to be movable in the direction of the optical axis engages with this cam groove 165.

Figure 21:
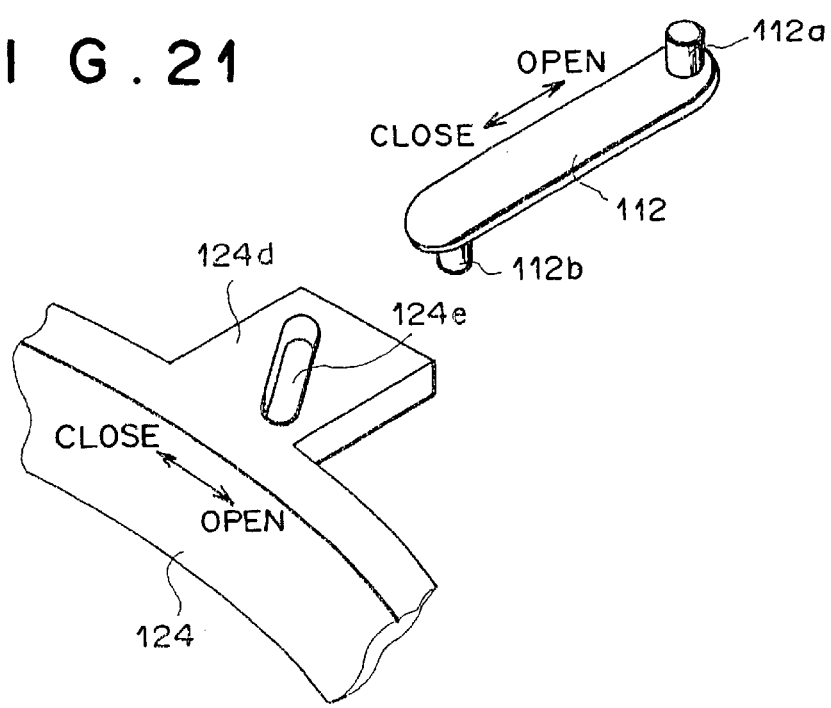
FIG. 21 is an exploded perspective view showing the configuration of an actuating lever and barrier drive ring coupling section.

A short projection 124d extending rearwards as shown in FIG. 21 is formed at the top of the barrier drive ring 124. A cam groove 124e extending substantially at right angles to the cam groove 165 of the rotating barrel 106, i.e. extending in a direction from the upper left to the lower right of FIG. 20, is formed in this projection 124d. A cam pin (cam follower) 112b projecting from the rear end of the actuating lever 112 then engages with this cam groove 124e.

Figure 22A:
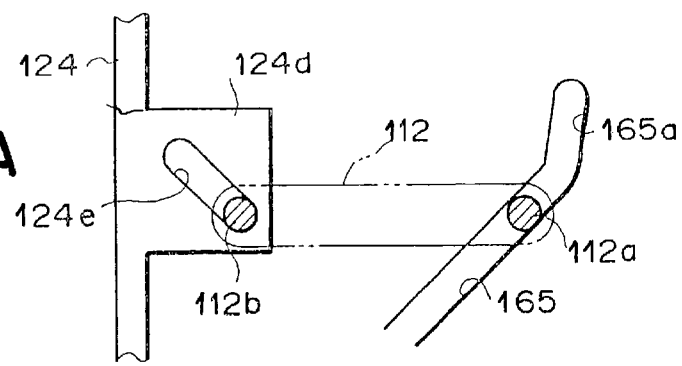
FIGS. 22A and 22B are explanatory views showing the operation when a lens barrel is retracted in to a fully retracted state from a state where photographing is possible.
Figure 22B:
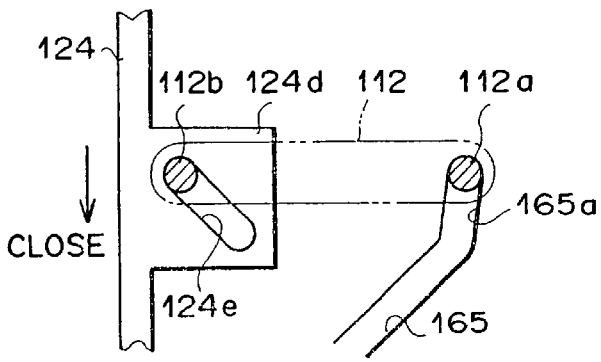

FIG. 22A and FIG. 22B are views describing the operation of the actuating lever 112 of the barrier opening and closing mechanism having the above configuration.

The cam groove 165 formed in the rotating barrel 106 is parallel with the helicoid 162 for use in driving the moveable barrel 105 in the range from the telephoto end to the wideangle end. Therefore, when the rotating barrel 106 is rotatably driven by a motor from the telephoto end shown in FIG. 15 towards the wide-angle end shown in FIG. 14 and to the lower part of FIG. 22, the cam pin 112a of the actuating lever 112 moves towards the right of the drawing at a speed proportional to the rotational speed of the rotating barrel 106 and the barrier drive ring 124 held by the moveable barrel 105 also moves towards the right of the drawing at the same speed and the relative positions of the barrier drive ring 124 and the actuating lever 112 up to the wide-angle end do not change.

Next, when the engaging pin 112a enters within the slightly inclined portion 165a of the cam groove 165, the barrier drive ring 124 still moves towards the right of the drawing at a speed proportional to the rotational speed of the rotating barrel 106 in accordance with the moveable barrel 105. However, the speed of movement of the cam pin 112a slows down and the actuating lever 112 is therefore pushed towards the left of the drawing. As a result, the cam pin 112b on the left end of the actuating lever 112 moves towards the left relative to the barrier drive ring 124. The barrier drive ring 124 therefore rotates downwards in the drawing due to the operation of the cam groove 124e forming an inclined plane and when the rotating barrel 106 rotates up to the completely retracted position, as shown in FIG. 22B, the cam pin 112a reaches the end of the slightly inclined portion 165a of the cam groove 165, the cam pin 112b reaches the upper left end of the cam groove 124e and the lens barrier is held in the closed position. On the other hand, the lens barrier is held in the open position from the rotating barrel 106 being rotated from the completely retracted position to the telephoto end onwards. As is clear from the above description, in this embodiment production of the cam groove 165 is straightforward because the cam groove 165 used in driving the actuating lever 112 that is caused to rotate by the barrier drive ring 124 is formed at the inner surface of the rotating barrel 106.

Further, the barriers 122 and 122 can be smoothly and reliably opened and closed because the configuration is such that the actuating lever is caused to move in the direction of the optical axis in accompaniment with the rotation of the rotating member between the wide-angle end and the completely retracted position and the barrier drive ring 124 is caused to rotate by the movement of the actuating lever 112.

The opening and closing of the lens barrier is also stable because the cam pins 112a and 112b usually engage with the cam grooves 165 and 124e and the spring 125 for urging the barrier drive ring 124 in the barrier opening direction can be omitted.

Figure 23:
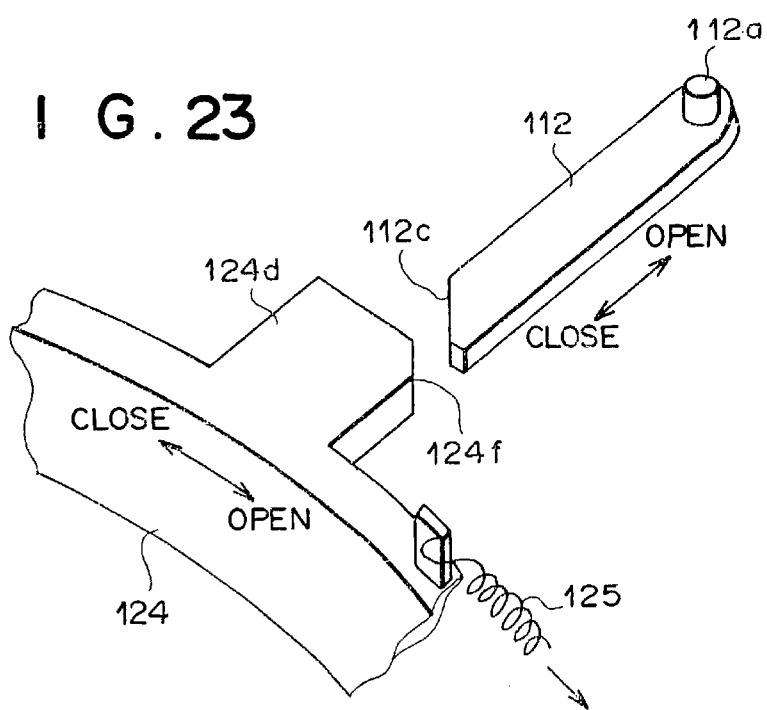
FIG. 23 is an exploded perspective view showing the changes in an actuating lever and barrier drive ring coupling section.
Figure 24A:
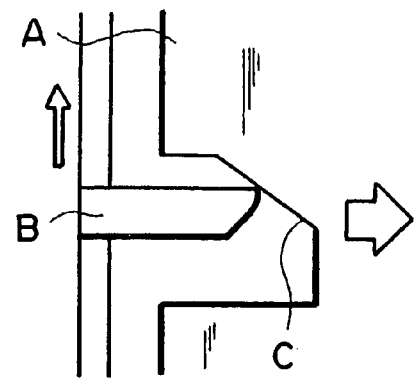
FIGS. 24A and 24B are views describing the related art.
Figure 24B:
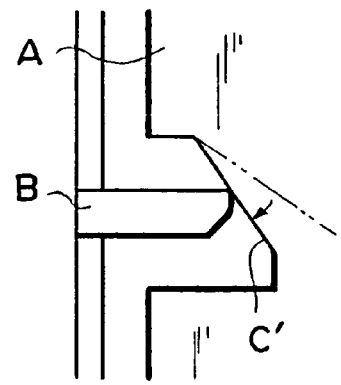

It is also possible for the actuating lever 112b and cam groove 124e shown in FIG. 21 to be replaced as the means for coupling the actuating lever 112 and the barrier drive ring 124 by, as shown, for example, in FIG. 23, having the projection 124d on the side of the barrier drive ring 124 engage with the inclined surface 112c formed on the side of the actuating lever 112. In this case, the spring 125 for urging the barrier drive ring 124 in the barrier opening direction is necessary.

What is claimed is:

1. A barrier opening and closing mechanism for a camera comprising:

a lens barrel having a rotating barrel capable of rotation about an optical axis a front lens group, and a rear lens group, the lens barrel capable of being extended and retracted with respect to a camera body by rotation of the rotating barrel;

a lens barrier, arranged at the front end of the lens barrel, for opening and closing the front surface of the front lens group; and a barrier opening and closing drive member positioned at the lens barrel so as to be rotatable about the optical axis, with rotation of the barrier opening and closing drive member causing the lens barrier to open or close, said barrier opening and closing mechanism comprising:

a first coupling means for coupling the rear lens group to the rotating barrel in such a manner that the rear lens group rotates about the optical axis in the vicinity of a retracted position of the lens; and a second coupling means for coupling the barrier opening and closing drive member to the rear lens group such that the barrier opening and closing drive member rotates in accompaniment with rotation of the rear lens group.

2. The barrier opening and closing mechanism of claim 1, wherein the second coupling means comprises a coupling lever extending rearwards in the direction of the optical axis from the barrier opening and closing member, and an engaging member provided on the rear lens group holder and being usually engaged with the coupling lever.

3. A barrier opening and closing mechanism for a camera comprising:

a lens barrel having a rotating barrel capable of rotation about an optical axis and the lens barrel capable of being extended and retracted with respect to a camera body by rotation of the rotating barrel;

a lens barrier, arranged at the front end of the lens barrel, for opening and closing a lens aperture; and a barrier drive ring positioned at the lens barrel so as to be rotatable about the optical axis, with rotation of the barrier drive causing the lens barrier to open or close, said barrier opening and closing mechanism comprising:

a cam groove provided at the rotating barrel; and an actuating lever, having a cam follower engaging with the cam groove, moving in the direction of the optical axis and at a same speed as the barrier drive ring such that the actuating lever rotates the barrier drive ring in accompaniment with rotation of the rotating barrel occurring in the vicinity of a position of retraction of the lens barrel.

* * * * *